(12) United States Patent
Ashbrook et al.

(10) Patent No.: US 9,681,207 B2
(45) Date of Patent: Jun. 13, 2017

(54) LOCAL BUFFERS IN A LIQUID CRYSTAL ON SILICON CHIP

(71) Applicant: FINISAR CORPORATION, Sunnyvale, CA (US)

(72) Inventors: Jonathan B. Ashbrook, Homer, IL (US); Lionel Li, San Francisco, CA (US); Brian R. Carey, Sunnyvale, CA (US); Nicholas F. Jungels, Champaign, IL (US)

(73) Assignee: FINISAR CORPORATION, Sunnyvale, CA (US)

( * ) Notice: Subject to any disclaimer, the term of this patent is extended or adjusted under 35 U.S.C. 154(b) by 433 days.

(21) Appl. No.: 13/749,529

(22) Filed: Jan. 24, 2013

(65) Prior Publication Data

US 2014/0204299 A1    Jul. 24, 2014

(51) Int. Cl.
*H04Q 11/00*     (2006.01)
*G09G 3/36*      (2006.01)
*G02F 1/1362*    (2006.01)

(52) U.S. Cl.
CPC ....... *H04Q 11/0005* (2013.01); *G09G 3/3685* (2013.01); *G02F 2001/136281* (2013.01); *G02F 2203/585* (2013.01); *G09G 2310/027* (2013.01); *G09G 2310/0259* (2013.01); *G09G 2310/0291* (2013.01); *H04Q 2011/0035* (2013.01); *H04Q 2011/0039* (2013.01)

(58) Field of Classification Search
CPC .. G02B 26/00; G02F 1/13; G09G 2310/0286; G09G 3/3685; G09G 3/3688; G09G 3/3692

USPC ........................... 345/87, 204, 100; 359/237
See application file for complete search history.

(56) References Cited

U.S. PATENT DOCUMENTS

| 5,477,234 | A | 12/1995 | Suzuki et al. |
| 6,384,817 | B1* | 5/2002 | Janssen ................ G09G 3/2011 345/204 |
| 2003/0025658 | A1* | 2/2003 | Janssen ................. G02F 1/1309 345/87 |
| 2003/0076285 | A1* | 4/2003 | Albu .................... G09G 3/2011 345/87 |
| 2003/0227448 | A1* | 12/2003 | Janssen ................ G09G 3/2011 345/204 |
| 2004/0233150 | A1* | 11/2004 | Guttag et al. ................... 345/87 |

(Continued)

FOREIGN PATENT DOCUMENTS

JP    H06-314080 A    11/1994
JP    2001-324963 A   11/2001
(Continued)

OTHER PUBLICATIONS

International Search Report and Written Opinion mailed Jun. 25, 2014 in related PCT Application No. PCT/US2014/013051.

*Primary Examiner* — Grant Sitta
(74) *Attorney, Agent, or Firm* — Maschoff Brennan

(57) ABSTRACT

An example embodiment includes a liquid crystal on silicon (LCOS) system. The LCOS system includes multiple pixels, a pixel voltage supply source (voltage source), an external buffer, and a local buffer. The voltage source is configured to supply an analog ramp to the pixels. The external buffer is configured to buffer the voltage source from the pixels. The local buffer is configured to buffer the external buffer from a subset of pixels of the plurality of pixels.

12 Claims, 3 Drawing Sheets

(56) References Cited

U.S. PATENT DOCUMENTS

| | | | |
|---|---|---|---|
| 2005/0151585 A1* | 7/2005 | Honda | H03F 1/305 330/10 |
| 2006/0103910 A1* | 5/2006 | Huang et al. | 359/237 |
| 2006/0187178 A1* | 8/2006 | Sun | G09G 3/3688 345/100 |
| 2008/0018639 A1* | 1/2008 | Welbers | G09G 3/3688 345/212 |
| 2010/0033496 A1* | 2/2010 | Mancuso | 345/604 |
| 2010/0045638 A1* | 2/2010 | Cho | G09G 3/3688 345/204 |
| 2010/0141493 A1* | 6/2010 | Cho | G09G 3/20 341/122 |
| 2010/0220084 A1* | 9/2010 | Chiang | G09G 3/3685 345/211 |
| 2010/0259465 A1* | 10/2010 | Chang | G09G 3/20 345/55 |
| 2010/0289734 A1* | 11/2010 | Wu et al. | 345/98 |
| 2011/0012888 A1* | 1/2011 | Ko | G09G 3/3648 345/212 |
| 2011/0032129 A1* | 2/2011 | Tu et al. | 341/122 |
| 2012/0081340 A1* | 4/2012 | Lee | G09G 3/3685 345/206 |

FOREIGN PATENT DOCUMENTS

| | | |
|---|---|---|
| JP | 2006-30592 A | 2/2006 |
| JP | 2008-170842 A | 7/2008 |

\* cited by examiner

LOCAL BUFFERS IN A LIQUID CRYSTAL ON SILICON CHIP

BACKGROUND

Field of the Invention

Embodiments described herein relate generally to optical switches. More particularly, example embodiments relate to liquid crystal on silicon integrated circuits (LCOS ICs) that may be included in optical switches.

Related Technology

Signal-carrying light may be multiplexed onto an optical fiber to increase the capacity of the optical fiber and/or enable bidirectional transmission. Optical switches are generally used to multiplex, de-multiplex, or dynamically route a particular channel of the signal-carrying light. One type of optical switch is a wavelength selector switch (WSS) which routes the particular channel based on the wavelength of the particular channel.

In some WSS, liquid crystal on silicon (LCOS) technology is used to create a display engine that deflects a wavelength of the particular channel. In LCOS technology, liquid crystals may be applied to a surface of a silicon chip. The silicon chip may be coated with a reflective layer. For example, the reflective layer may include an aluminized layer. Additionally, in LCOS technology, the display engine may include multiple pixels. Through introduction and alteration of electrical voltage applied to the pixels, the pixels create an electrically controlled grating that routes the particular channel in a deflected direction. In some embodiments, the electrical voltages applied to the pixels may be supplied by a voltage source. The voltage source may be subject to varying capacitance loads during introduction and alteration of electrical voltage.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Embodiments described herein relate generally to optical switches. More particularly, example embodiments relate to liquid crystal on silicon integrated circuits (LCOS ICs) that may be included in optical switches.

An example embodiment includes a liquid crystal on silicon (LCOS) system. The LCOS system includes multiple pixels, a pixel voltage supply source (voltage source), an external buffer, and a local buffer. The voltage source is configured to supply an analog ramp signal to the pixels. The external buffer is configured to buffer the voltage source from the pixels. The local buffer is configured to buffer the external buffer from a subset of pixels of the plurality of pixels.

Another example embodiment includes a LCOS IC. The LCOS IC includes an integrated circuit input line, multiple pixels, and multiple column drivers. The integrated circuit input line is configured to receive a pixel voltage supply signal. The pixels are arranged into columns of pixels and rows of pixels. Each column driver is electrically coupled to at least one column of pixels and configured to buffer the integrated circuit input line from the at least one column of pixels.

Another embodiment includes a column driver for driving voltages to a subset of pixels of a LCOS IC. The column driver includes a sample and hold circuit configured to sample a voltage on an integrated circuit input line. The sample and hold circuit includes a primary capacitor, a primary amplifier, and a sample switch. The primary amplifier is configured to at least partially buffer the integrated circuit input line from the subset of pixels. The sample switch is coupled between the integrated circuit input line and the primary amplifier such that when the sample switch is closed, the voltage on the integrated circuit input line is applied to the primary capacitor and the primary amplifier.

This Summary is provided to introduce a selection of concepts in a simplified form that is further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description, which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Embodiments described herein relate generally to optical switches. More particularly, example embodiments relate to liquid crystal on silicon integrated circuits (LCOS ICs) that may be included in optical switches. An example embodiment includes a liquid crystal on silicon (LCOS) system including multiple pixels and a pixel voltage supply source (voltage source). The LCOS system includes an external buffer and a local buffer. The external buffer is configured to buffer the voltage source from the pixels. The local buffer is configured to buffer the external buffer from a subset of the pixels. By buffering the external buffer from the subset of the pixels, variations in capacitance loads imposed on the external buffer, for instance, may be reduced when compared to a LCOS system not including the local buffer. Additional example embodiments of the present invention will be explained with reference to the accompanying drawings.

Figure 1A:
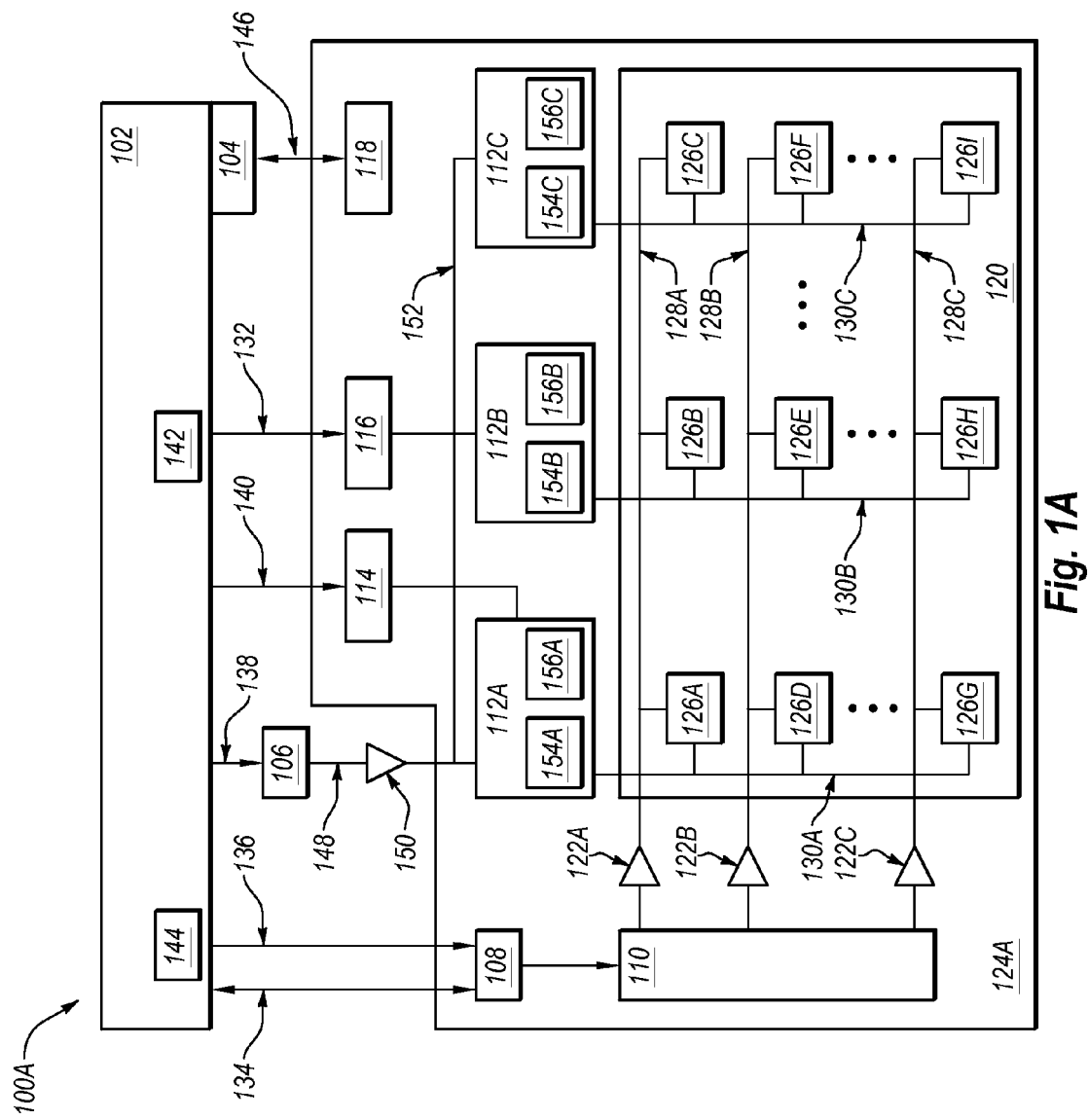
FIGS. 1A and 1B are block diagrams of example liquid crystal on silicon (LCOS) systems in which the embodiments disclosed herein may be implemented.

FIG. 1A is a block diagram of an example liquid crystal on silicon (LCOS) system 100A in which the embodiments disclosed herein may be implemented. Generally, the LCOS system 100A writes images used to select wavelength or channels of optical signal-carrying light (optical signals). The LCOS system 100A can include a driver chip such as a field programmable gate array (FPGA) 102 that controls the liquid crystal on silicon integrated circuit (LCOS IC) 124A. To control the LCOS IC 124A, the FPGA 102 communicates commands, synchronization signals, digital data, varying analog, and/or digital signals, or some combination thereof. Additionally, the FPGA 102 may receive various analog and/or digital data signals, output synchronization signals, etc. from the LCOS IC 124A.

The FPGA 102 is an integrated circuit (IC) with logic blocks, which may be configured to perform one or more control functions of the LCOS IC 124A. The FPGA 102 may be configured and/or programmed after the LCOS system 100A is delivered to a user or following manufacturing of the FPGA 102. In some alternative embodiments the driver chip may include an application specific integrated circuit (ASIC) or another suitable driver chip having substantially equivalent capabilities of the FPGA 102.

The FPGA 102 may include a digital port 142 which may communicate with a demultiplexing module 116 included in the LCOS IC 124A. An example of the digital port 142 may include a low voltage differential signal (LVDS) pair. The FPGA 102 may communicate digital data through the digital port 142 to the demultiplexing module 116. In FIG. 1, arrow 132 represents the communication of digital data to the demultiplexing module 116. Digital data may include, but is not limited to, a digital clock signal that may be used as a synchronization signal and digital image data for one or more pixels 126A-126I (generally, pixel 126 or pixels 126) included in the LCOS IC 124A. The digital image data includes a digital representation of an image the LCOS IC 124A displays. The digital image data may be formatted as 6 bit per pixel, 7 bit per pixel, or 8 bit per pixel, for example. The digital data, or some portion thereof, may be communicated to one or more column drivers 112A-112C (generally, column driver 112 or column drivers 112) which may then be communicated to the pixels 126. Some additional details of the column drivers 112 and the pixels 126 are provided below.

Some embodiments of the FPGA 102 may include multiple digital ports 142 and/or the LCOS IC 124A may include multiple demultiplexing modules 116. In embodiments in which the FPGA 102 includes multiple digital ports 142, the FPGA 102 may communicate a specific or a set amount of digital data through each of the digital ports 142 in parallel. For example, in some embodiments, the FPGA 102 includes thirty-two digital ports 142. Each of the thirty-two digital ports 142 may communicate digital image data for a bank of pixels 126 including sixty columns of pixels 126.

The FPGA 102 may also include a command port 144 that communicates commands to a command decoder 108. In FIG. 1, arrow 136 represents the communication of commands to the command decoder 108. The commands may include one or more actions and/or function for the LCOS 124A to perform. For example, a command may include timing of operations to write a row of the pixels 126. A timing command may be controlled by the FPGA 102 via the command port 144. Additionally or alternatively, a command may include a digital clock signal that may be used as a synchronization signal. In some embodiments, the FPGA 102 may include multiple command ports 144.

The command decoder 108 and the command port 144 may also communicate additional signals. In FIG. 1, double-ended arrow 134 represents the communication of additional signals between the command port 144 and the command decoder 108. For example, the additional signals may include, but are not limited to, an auxiliary digital data signal, a reset signal, data out signals from the LCOS IC 124A, and output clock signals from the LCOS IC 124A. The reset signal and the auxiliary digital data signal may include a digital clock signal as a synchronization signal. The data out signals and the output clock signals may communicate information regarding synchronization and operational status of the LCOS IC 124A to the FPGA 102.

The FPGA 102 may also include an analog module 104 that communicates analog signals with an LCOS analog module 118. In FIG. 1, the double-ended arrow 146 represents the communication between the analog module 104 and the LCOS analog module 118.

The FPGA 102 may also communicate a digital ramp signal to a digital to analog converter (DAC) 106. In FIG. 1A, arrow 138 represents the communication of the digital ramp signal to the DAC 106. The DAC 106 receives the digital ramp signal and outputs an analog ramp signal related to the digital ramp signal. The digital ramp signal is a binary number that represents and is proportional to an analog voltage of the analog ramp signal output from the DAC 106.

In some embodiment, the digital ramp signal includes a series of binary numbers that are converted to a monotonically varying voltage which ramps from an initial voltage to a final voltage. The term "ramp" refers to the behavior of incrementally varying at a defined rate. That is, in some embodiments, an initial binary number of the digital ramp signal is converted to an initial voltage which may be as high as about 12 volts (V). The digital ramp signal may subsequently include binary numbers resulting in an analog ramp signal that monotonically steps down to a final voltage. Alternatively, an initial binary number of the digital ramp signal can be converted to an initial voltage which may be as low as 0 V. The digital ramp signal may subsequently include binary numbers that result in voltages that monotonically step up to a final voltage. In some embodiments, each step may be a predetermined time interval during which the digital ramp signal includes a binary number that results in a predetermined change in voltage. Additionally, the digital ramp signal may vary according to a gamma curve, which can correct for nonlinear optical response of LCOS material.

The digital ramp signal is not limited to the series of binary numbers that result in the monotonically ramping voltage. The digital ramp signal can include a series of binary numbers that result in multiple patterns or progressions of voltages. For example, the digital ramp signal can include binary numbers that result in a set of increasing voltages and then a set of decreasing voltages, vice versa, or some other suitable pattern resulting in voltages covering the range of voltages to drive the pixels 126 of the LCOS IC 124A.

As stated above, the DAC 106 converts the digital ramp signal to an analog ramp signal representative of the binary number included in the digital ramp signal. Accordingly, the analog ramp signal is an analog representation of the digital ramp signal. The analog ramp signal may exhibit incrementally varying behavior equivalent or related to the digital ramp signal. Thus, in some embodiments, the analog ramp signal monotonously varies from the initial voltage to the final voltage, supplying a varying voltage signal to the pixels 126. More specifically, the analog ramp signal supplies target voltages to the pixels 126. The target voltages are defined voltages within the inclusive range of the initial voltage to the final voltage of the analog ramp signal. The LCOS IC 124A operates, at least partially, through driving the target voltages to the pixels 126.

A brightness of a pixel 126 may be determined by the magnitude of a target voltage supplied to the pixel 126. Thus, the brightness of the pixel 126 is controlled by driving the analog ramp signal during the time in which the target voltage of the analog ramp signal is equal to the voltage corresponding to a desired brightness. Pixels 126 may include multiple levels of brightness. For example, in some embodiments the pixel 126 can be programmed to display 256 or more levels of brightness. The process of supplying the pixels 126 with target voltages may be referred to as "writing an image."

Additionally, the analog ramp signal may monotonically vary from the initial voltage to the final voltage once per writing cycle of the pixels 126. The initial voltage and the final voltage may periodically change, interchange, or turn around. That is, in a first writing cycle, the final voltage may be greater than the initial voltage. In a second writing cycle, the initial voltage may be greater than the final voltage. In a third cycle, the final voltage may again be greater than the initial voltage. The initial voltage and the final voltage may continue to change in this pattern.

To determine when to supply the analog ramp signal to the pixels 126, the FPGA 102 may also communicate a ramp counter enable signal to a ramp counter 114 included in the LCOS IC 124A. In FIG. 1, arrow 140 represents the communication of the ramp counter enable signal to the ramp counter 114. Generally, the ramp counter 114 receives the ramp counter enable signal from the FPGA 102, which enables or turns on the ramp counter 114. Once enabled, the ramp counter 114 counts or tracks the number of predetermined time intervals of the digital ramp signal that have occurred since receiving the ramp counter enable signal. The number of predetermined time intervals of the digital ramp signal may be equivalent and/or related to the number of predetermined time intervals of the analog ramp signal. More specifically, in some embodiments, the digital ramp signal may include a ramp clock signal. The ramp clock signal may act as a synchronization signal. The ramp counter 114 may track and/or count the number of predetermined time intervals included in the ramp clock signal following the reception of the ramp counter enable signal. The ramp counter 114 may output or otherwise make available a ramp step signal indicating the number of predetermined time intervals.

The ramp counter 114 may be coupled to the column drivers 112. The ramp counter 114 may communicate the ramp step signal to the column drivers 112. Thus, the ramp counter 114 and the ramp step signal may be used to determine the voltage of the analog ramp signal at a specific time. That is, the voltage of the analog ramp signal may be calculated if the initial voltage resulting from an initial binary number of the digital ramp signal, the predetermined voltage change per predetermined time interval, and the ramp step signal are known.

Referring back to the DAC 106, the analog ramp signal exiting the DAC 106, which is indicated by the line 148, enters an external buffer 150. The external buffer 150 may buffer the DAC 106 and/or the FPGA 102 from the LCOS IC 124A. From the external buffer 150, the analog ramp signal enters the LCOS IC 124A and supplies the column drivers 112, which then supplies the pixels 126 included in an array core 120.

Each of the pixels 126 may include a NMOS/PMOS complementary switch, a metal insulator-metal (MIM) capacitor, and a piece of top-layer metal. The complementary switch may enable linear transfer of voltage supplied by the column drivers 112 to enter the pixel 126. The MIM capacitor may be included to provide enough capacitive storage to limit charge leakage during a field time.

In this and other embodiments, the array core 120 includes the pixels 126 that may be organized into columns and rows. Each of the column drivers 112 supplies the pixels 126 in the corresponding column via a column wires 130A-130C (generally, column wire 130 or column wires 130). In the depicted embodiment, the array core 120 includes nine pixels 126A-126I. However, this depiction is not limiting. The ellipses are included to illustrate that the array core 120 may include more than nine pixels 126. In some embodiments, the array core 120 may be separated into banks of columns which banks of columns may be coupled to one of the digital port 142 (described above).

The pixels 126 in each row may be electrically coupled to a row decode 110 via a row wire 128A-128C (generally, row wire 128 or row wires 128) and the pixels 126 in each column may be electrically coupled to one of the column drivers 112 via a column wire 130.

The row decode 110 may receive commands from the command decoder 108. Specifically, the row decode 110 may receive commands related to activation of the pixels 126 in a row. The row decode 110 may then communicate the command related to activation through a row enable amplifier 122A-122C (generally, row enable amplifier 122 or row enable amplifiers 122), along one of the row wires 128 to the pixels 126 in the row. The activation signal enables or triggers the receiving pixels (i.e., the pixels 126 in the row coupled to the row enable amplifier 122) to be driven to a target voltage. Once activated, the pixels 126 in the row receive signals from the column drivers 112 (described below).

In some embodiments, the pixels 126 may be written row by row. That is, the first row enable amplifier 122A communicates the activation signal to the first pixel 126A, the second pixel 126B, and the third pixel 126C through the first row wire 128A. After the first pixel 126A, the second pixel 126B, and the third pixel 126C are written, the second row enable amplifier 122B then communicates the activation signal to the fourth pixel 126D, the fifth pixel 126E, and the sixth pixel 126F through the second row wire 128B.

In some embodiments, the column drivers 112 include local buffers that re-buffer the analog ramp signal that supplies voltage to the pixels 126. Accordingly, the LCOS IC 124A may be electrically coupled to the FPGA 102, or another driver circuit, which may act as a pixel voltage supply source (referred to generally as a voltage source). The voltage source supplies a pixel voltage supply signal (supply signal) that powers the pixels 126. In this and other embodiments, the supply signal is the digital ramp signal input to the DAC 106, which is converted to the analog ramp signal representative of the digital ramp signal. Thus, in these and other embodiments, the voltage source may be characterized as an analog source when viewed from the LCOS IC 124A.

The analog ramp signal output from the DAC 106 proceeds through the external buffer 150. The external buffer 150 is configured to buffer the voltage source (i.e., the FPGA 102) from the LCOS IC 124A. By buffering the voltage source from the LCOS IC 124A, a more consistent load may be applied to the voltage source. For example, when the FPGA 102 supplies the digital ramp signal to the DAC 106, a load placed on the FPGA 102 by the LCOS IC 124A may be buffered by the external buffer 150.

The analog ramp signal may exit the external buffer 150 and enter the LCOS IC 124A on the integrated circuit input line (IC input) 152. The IC input 152 may be electrically coupled to the external buffer 150 and the column drivers 112.

In some embodiments, the IC input 152 may be electrically coupled to sample switches 156A-156C (generally, sample switch 156 or sample switches 156) which are further coupled to local buffers 154A-154C (generally, local buffer 154 or local buffers 154) included in each of the column drivers 112. In this example configuration, the sample switches 156 may control the introduction of the analog ramp signal to the local buffers 154. As used herein, when the sample switches 156, or any other switches are open, the sample switches 156 prevent the introduction of the analog ramp signal to the local buffers 154. Accordingly, when the sample switches 156 are closed, the sample switches enable the introduction of the analog ramp signal to the local buffers 154. This "open" and "closed" convention is used throughout this application.

In some alternative embodiments, the local buffers 154 included in the column drivers 112 are coupled to the IC input 152. In these embodiments, the sample switches 156 may be coupled between the local buffers 154 and the pixels 126, the sample switches 156 may be included elsewhere along a corresponding column wire 130, or the sample switches 156 may be omitted. Some additional details of an alternative embodiment are included with reference to FIG. 1B.

In operation, when the analog ramp signal is between about an initial voltage and about a target voltage for the specific subset of pixels 126, the sample switch 156 may be closed, thus enabling the introduction of the analog ramp signal to the local buffers 154. The local buffer 154 may drive the target voltage onto the subset of the pixels 126 electrically coupled to the local buffer 154.

While driving the target voltage to the subset of pixels 126, the local buffer 154 may additionally buffer the external buffer 150 and/or voltage source from the subset of pixels 126. Buffering the external buffer 150 and/or the voltage source may reduce a load and/or a load variance imposed on the external buffer 150 and/or voltage source when compared to embodiments not including the local buffers 154. The load and/or the load variance may be due to capacitance of the pixels 126 and the column wires 130, for instance. The local buffers 154 may accordingly enable the slew rate of the external buffer 150 to substantially match the slew rate of the analog ramp signal and/or may increase the slew rate of the external buffer 150 by hiding the capacitance of the pixels 126 and the column wires 130 from the external buffer 150.

When the analog ramp signal is between about a target voltage and about a final voltage for the specific subset of pixel 126, the sample switch 156 may be open to prevent the introduction of the analog ramp signal to the local buffers 154. When the sample switch 156 is open, the load from the local buffer 154 and the subset of pixels 126 may be removed from the external buffer 150 and/or the voltage source.

In this and other embodiments, the pixels 126 are arranged in columns with a column driver 112 that include a local buffer 154 and a sample switch 156 coupled to each of the columns. Accordingly, the local buffers 154 included in each of the column drivers 112 may be configured to buffer the IC input 152 from the column of pixels as well as control the introduction of supply voltages to the column of pixels. Thus, by coupling the local buffer 154 and the sample switch 156 to each of the columns, the load imposed by each of the columns may be individually removed from the external buffer 150 and/or the voltage source. Consequently, the external buffer 150 may not "see" as big of capacitance change as embodiments without a local buffer 154 and a sample switch 156 coupled to each of the columns. Additionally, the cumulative load of all the pixels 126 and the column wires 130 may be buffered from the external buffer 150 and/or the voltage source when target voltages are reached. Some additional details of an example column driver are provided with reference to FIG. 2.

For example, the first pixel 126A may have a target voltage of 2 V and the second pixel 126B may have a target voltage of 4 V. The initial voltage may be 0 V and the final voltage may be 6 V. To write these target voltages (i.e., 2 V to the first pixel 126A and 4 V to the second pixel 126B) the first row enable amplifier 122A communicates the activation signal to the first pixel 126A and the second pixel 126B through the first row wire 128A. When the analog ramp voltage is between 0 V and about 2 V, a first sample switch 156A and a second sample switch 156B are closed. A first local buffer 154A and a second local buffer 154B drive the analog ramp voltage or some portion thereof to the first pixel 126A and the second pixel 126B, respectively. During this time, the local buffers 154 are buffering the external buffer 150 and/or the voltage source from the pixels 126 and the column wires 130.

When the analog ramp voltage reaches 2 V, the first sample switch 156A opens, but the second sample switch 156B remains closed. By opening the first sample switch 156A, any load imposed by the first pixel 126A, a fourth pixel 126D, a seventh pixel 126G, and the first column wire 130A is removed from the external buffer 150 and/or the voltage source. When the analog ramp voltage reaches 4 V, the second sample switch 156B opens. With the first sample switch 156A and the second sample switch 156B open, the load imposed by the pixels (the first pixel 126A, the fourth pixel 126D, the seventh pixel 126G, the second pixel 126B, a fifth pixel 126E, and an eighth pixel 126H) and the first and second column wires 130A and 130B are removed from the external buffer 150 and/or the voltage source, the analog ramp voltage continues to monotonically vary until the final voltage of 6 V.

Figure 1B:
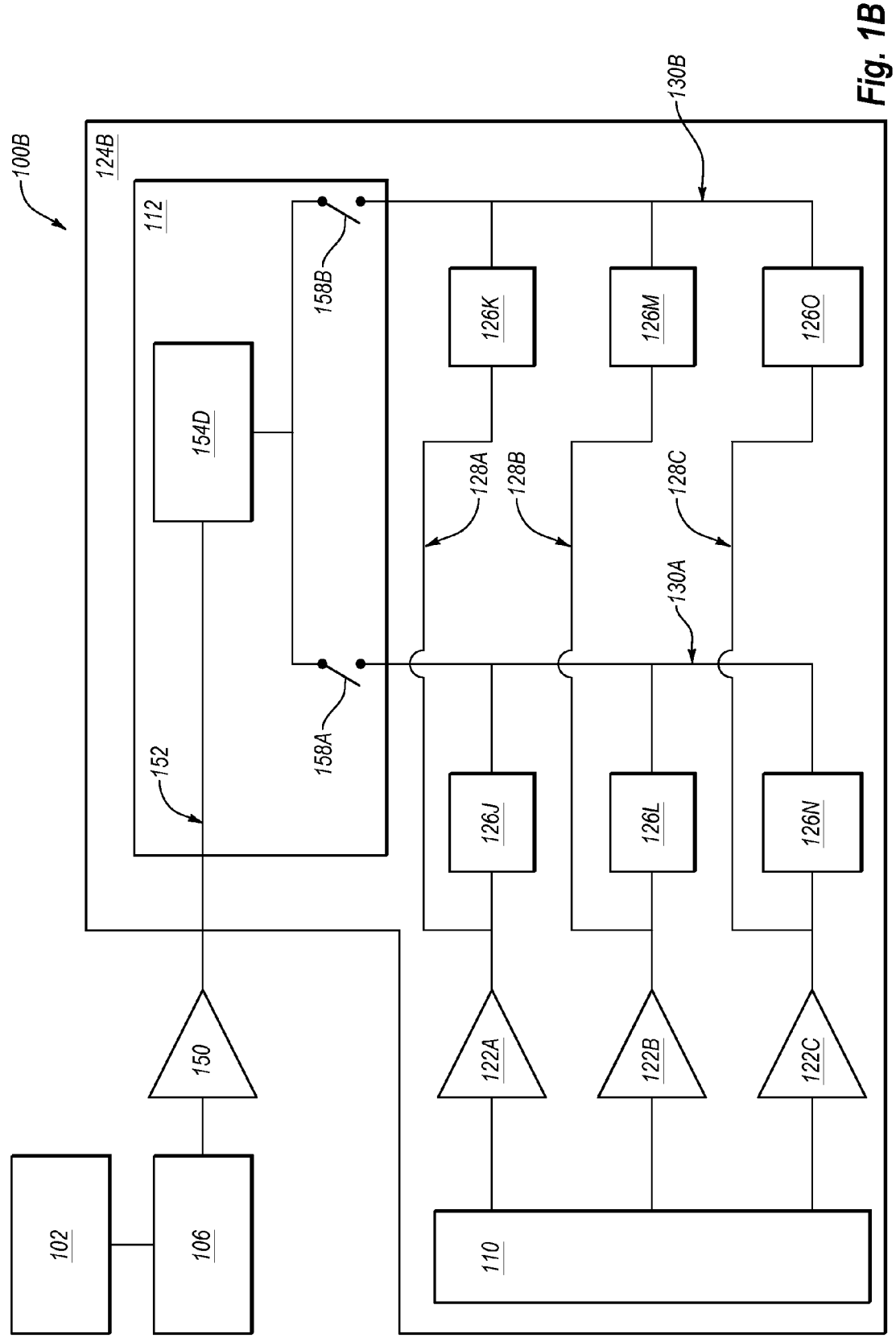

FIG. 1B is a block diagram of an example liquid crystal on silicon (LCOS) system 100B (the second LCOS system 100B) in which the embodiments disclosed herein may be implemented. The second LCOS system 100B is substantially similar to the LCOS system 100A depicted in FIG. 1A and consequently includes one or more components (e.g., 102, 112, 106, 150, 152, 110, 122, 126, 128, and 130) described with respect to FIG. 1A. Some details of these components are not repeated with reference to FIG. 1B. The second LCOS system 100B, however, is a further simplified block diagram, which omits one or more components (e.g., 144, 142, 104, 118, 116, 114, and 108) previously described with reference to FIG. 1A. While these components are not explicitly included in the second LCOS system 100B, it should be appreciated that these components and associated functionality may be included in the second LCOS system 100B. Additionally, for further simplicity, FIG. 1B includes six pixels 126J-126O (generally, pixel 126 or pixels 126), which are substantially similar and may correspond to the pixels 126 depicted in FIG. 1A. The pixels 126 in the second LCOS system 100B are organized into columns and rows with column wires 130 and row wires 128 as described with reference to FIG. 1A.

The primary difference between the LCOS system 100A of FIG. 1A and the second LCOS system 100B of FIG. 1B is the configuration of the column driver 112. The second LCOS system 100B includes a second LCOS IC 124B in which the column driver 112 may be included. In the second LCOS IC 124B, the column driver 112 includes a fourth local buffer 154D and downstream selector switches 158A and 158B (generally, downstream selector switch 158 or downstream selector switches 158).

Generally, the fourth local buffer 154D and the downstream selector switches 158 are substantially similar to the local buffers 154 and the sample switches 156, respectively described with respect to FIG. 1A. However, in the second LCOS IC 124B, the fourth local buffer 154D is positioned upstream of two columns of pixels 126. Thus, the fourth local buffer 154D buffers the external buffer 150 and/or the voltage source from the two columns of pixels 126 and the associated column wires 130. Note that in FIG. 1B, the fourth local buffer 154D buffers two columns of wires. However, this depiction is not meant to be limiting. In alternative embodiments, a second LCOS IC 124B may include a fourth local buffer 154D that buffers three or more columns of pixels.

By buffering the external buffer 150 and/or the voltage source from the columns of pixels 126 and the column wires 130, the fourth local buffer 154D may reduce a load and/or a load variance imposed on the external buffer 150 and/or voltage source when compared to embodiments not including the fourth local buffer 154D. Like the local buffers 154 described with reference to FIG. 1A, the fourth local buffer 154D may accordingly affect the slew rate of the external buffer 150.

The downstream selector switches 158 may be positioned between the fourth local buffer 154D and the column wires 130. As described above, the downstream selector switches 158 control the introduction of the analog ramp signal to the pixels 126.

Figure 2:
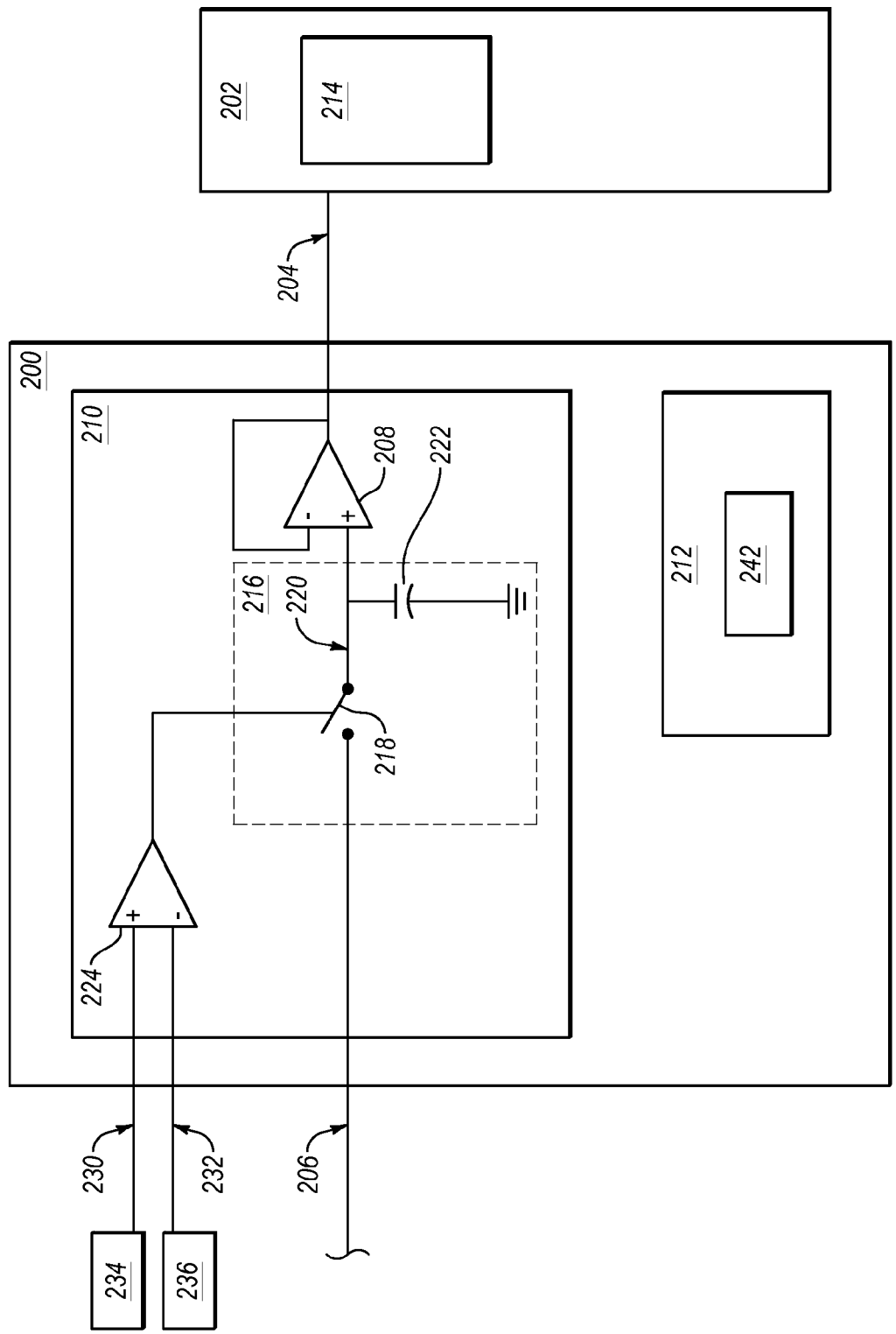
FIG. 2 is a block diagram of an example column driver that may be implemented in the LCOS system of FIG. 1A.

FIG. 2 is a block diagram of an example column driver 200 that may be included in the LCOS system 100A of FIG. 1A. The column driver 200 may be electrically coupled to a column of pixels 202 via a column wire 204. The column driver 200 may be configured to supply target voltages to the column of pixels 202. Additionally, the column driver 200 may be configured to buffer the integrated circuit input line (IC input) 206 from the column of pixels 202.

To buffer the IC input 206 from the column of pixels 202, the column driver 200 may include a primary circuit 210. The general purpose of the primary circuit 210 may include supplying target voltages to a subset of pixels 214 included in the column of pixels 202. The primary circuit 210 may include a sample and hold circuit 216. The sample and hold circuit 216 samples a voltage of a supply signal on the IC input 206. The IC input 206 may be coupled to a sample switch 218 that controls the introduction of the supply signal to a local input line 220 of a primary amplifier 208. While the sample switch 218 is closed, the supply signal on the IC input 206 supplies the primary amplifier 208. The primary amplifier 208 generates an output signal on the column wire 204 and the primary capacitor 222 charges. When the sample switch 218 opens, the primary amplifier 208 continues to generate the output signal on the column wire 204, matching the charge on the primary capacitor 222. However, when the sample switch 218 opens, the supply signal ceases to provide input to the local input line 220 and the local input line 220 is supplied by the primary capacitor 222.

In this and other embodiments, the IC input 206 includes an analog ramp signal that monotonically varies from an initial voltage to a final voltage at a predetermined voltage change per predetermined time interval as discussed above. Between the initial voltage and the final voltage, the analog ramp signal reaches a target voltage, which is driven to a subset of pixels 214. While the IC input 206 varies from the initial voltage to the target voltage, the sample switch 218 is closed. Accordingly, the IC input 206 (i.e., the analog ramp signal) is supplied to the primary amplifier 208. The primary amplifier 208 generates an output signal on the column wire 204 while the primary capacitor 222 charges. When the analog ramp signal reaches the target voltage, the sample switch 218 opens, thereby removing the supply to the primary amplifier 208. The primary amplifier 208 may include a near-infinite input impedance, thus the primary amplifier 208 may generate the output signal on the column wire 204 equal to the charge on the primary capacitor 222 without the primary capacitor 222 substantially discharging.

In some embodiments, the sample switch 218 is controlled by a digital comparator 224. The digital comparator 224 receives a target count signal at a positive input line 230 and a ramp step signal at a negative input line 232, for instance. In this and other embodiments, the target count signal may indicate the number of time intervals required for the analog ramp signal to reach the target voltage and, accordingly, may indicate how long the sample switch 218 is to remain closed. The target count signal may be communicated from a demultiplexing module 234 that receives digital data from an FPGA that controls a LCOS IC. For example, with combined reference to FIGS. 1 and 2, the FPGA 102 may communicate digital data to the demultiplexing module 116/234. The digital data may include the target count signal that may be communicated to the column drivers 112/200 and more specifically to the positive input line 230.

With continued reference to FIGS. 1 and 2, the ramp step signal may indicate the number of time intervals during which the analog ramp signal has be applied to the IC input 206. The ramp step signal may be communicated from the ramp counter 114/236. That is, the ramp counter 114/236 may receive the ramp counter enable signal from the FPGA 102 that starts the ramp counter 114/236 counting. The ramp counter enable signal may also represent a first time interval in which the analog ramp signal is applied to the IC input 206. The ramp step signal then tracks the number of time intervals during which the analog ramp signal supplies the local input line 220.

In some embodiments, the digital comparator 224 holds the sample switch 218 closed while the ramp step signal is less than the target count signal. When the ramp step signal is equal to or greater than the target count signal, the sample switch 218 is open.

Additionally, in some embodiments, the column driver 200 may include a flash circuit 212. The general purpose of the flash circuit 212 may include supplying a flash signal to the subsets of pixels 214 included in the column of pixels 202. The flash circuit 212 may include a second sample and hold circuit, which includes a flash amplifier 242. In some embodiments, the flash amplifier 242 may be configured to act with the primary amplifier 208 to buffer the IC input from the column of pixels 202.

The present invention may be embodied in other specific forms without departing from its spirit. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A liquid crystal on silicon system comprising:
a plurality of columns of pixels, the plurality of columns of pixels divided into a plurality of columns of pixels subsets, wherein each of the plurality of columns of pixels subsets include more than one of the plurality of columns of pixels;
a pixel voltage supply source configured to supply an analog ramp signal to the plurality of columns of pixels;
a plurality of local buffer amplifiers configured to directly supply the plurality of columns of pixels with voltages based on the analog ramp signal such that individual pixels on each of the plurality of columns of pixels are directly supplied with the voltages from the plurality of local buffer amplifiers, each of the plurality of local buffer amplifiers coupled to a different one of the plurality of columns of pixels subsets and each of the plurality of columns of pixels subsets are coupled to and only available to be coupled to only one of the plurality of local buffer amplifiers;
a plurality of selector switches, each of the plurality of selector switches coupled between one of the local buffer amplifiers of the plurality of local buffer amplifiers and one of the plurality of columns of pixels subsets; and
an external buffer amplifier coupled between the pixel voltage supply source and each of the plurality of local buffer amplifiers and configured to supply the analog ramp signal to the plurality of local buffer amplifiers.

2. The liquid crystal on silicon system of claim 1, wherein the analog ramp signal monotonically varies from an initial voltage to a final voltage.

3. The liquid crystal on silicon system of claim 2, wherein each of the plurality of selector switches is controlled by a digital comparator.

4. The liquid crystal on silicon system of claim 3, wherein one of the digital comparators is configured to compare a target count signal and a ramp step signal, the target count signal configured to indicate a number of time intervals for the analog ramp signal to reach a target voltage and the ramp step signal configured to indicate a number of time intervals during which the analog ramp signal has been supplied to the local buffer amplifier.

5. The liquid crystal on silicon system of claim 1, wherein the plurality of local buffer amplifiers are configured such that a slew rate of the external buffer amplifier substantially matches a slew rate of the analog ramp signal.

6. An integrated circuit, comprising:
an amplifier configured to output a pixel voltage supply signal;
an integrated circuit input line coupled to the amplifier and configured to receive the pixel voltage supply signal;
a plurality of pixels arranged into a plurality of columns of pixels;
a plurality of column drivers, wherein at least one of the plurality of column drivers comprise a buffer amplifier electrically coupled to at least two of the columns of pixels and the at least two of the columns of pixels are coupled to and only available to be coupled to the buffer amplifier of the at least one of the plurality of column drivers, wherein the at least one of the plurality of column drivers is configured to drive the at least two of the columns of pixels to voltages based on the pixel voltage supply signal such that individual pixels on each of the at least two of the columns of pixels are directly supplied with the voltages from the buffer amplifier and to buffer the integrated circuit input line from the at least two of the columns of pixels to reduce a load, a load variance, or a load and a load variance imposed on the integrated circuit input line from the at least two of the columns of pixels; and
a plurality of switching circuits, each of the plurality of switching circuits coupled between one of the at least two of the plurality of columns of pixels and the buffer amplifier.

7. The integrated circuit of claim 6, wherein the pixel voltage supply signal comprises an analog ramp signal that monotonically varies from an initial voltage to a final voltage and the column driver is configured to receive the pixel voltage supply signal and to supply the voltages, which are equal to a voltage between the initial voltage and the final voltage.

8. The integrated circuit of claim 6 wherein the column driver further comprises
a selector switch configured to connect and to disconnect an input of the buffer amplifier from the integrated circuit input line.

9. The integrated circuit of claim 8, wherein the selector switch is controlled by one or more digital signals.

10. The integrated circuit of claim 9, wherein the column driver further comprises a flash amplifier configured to flash the at least two of the columns of pixels with a flash voltage and at least partially buffer the integrated circuit input line from the at least two of the columns of pixels.

11. A system comprising:
a digital-to-analog converter configured to generate an analog ramp signal based on a digital ramp signal that repeatedly monotonically varies from a first level to a second level accordingly to a plurality of particular changes that occurs at particular intervals;
a plurality of column drivers, wherein one of the plurality of column drivers includes:
a comparison circuit configured to generate a comparison signal based on a comparison of a number of the particular intervals that have passed since the digital ramp signal changes from the first level and a particular level associated with a corresponding column driver;
a capacitor circuit configured to store a target voltage based on the analog ramp signal;
a hold switch circuit coupled to the capacitor circuit and configured to receive the analog ramp signal and the comparison signal and, based on the comparison signal, to pass the analog ramp signal or to not pass the analog ramp signal to the capacitor circuit; and
a drive amplifier circuit coupled to the capacitor circuit and configured to drive the target voltage from the capacitor circuit to a plurality of columns of pixels, wherein the drive amplifier circuit is coupled to at least two of the columns of pixels and the at least two of the columns of pixels are coupled to and only available to be coupled to the drive amplifier circuit;
a plurality of column switch circuits, each of the plurality of column switch circuits coupled between the drive amplifier circuit and the at least two of the columns of pixels such that each of the plurality of columns of pixels that is driven to the target voltage by the drive amplifier circuit is separated by the drive amplifier circuit by one of the plurality of column switch circuits, the plurality of column switch circuits configured to electrically couple and de-couple the drive amplifier circuit and the at least two of the columns of pixels; and a buffer amplifier circuit coupled between the digital-to-analog converter and the plurality of column drivers and configured to drive the analog ramp signal to the plurality of column drivers and to buffer an output node of the digital-to-analog converter from the plurality of column drivers to reduce a load, a load variance, or a load and a load variance imposed on the digital-to-analog converter from the plurality of column drivers.

12. The system of claim 11, wherein the column driver further comprises a flash amplifier configured to supply a flash voltage to the plurality of columns of pixels.

* * * * *